United States Patent [19]

Raue

[11] Patent Number: 5,335,762
[45] Date of Patent: Aug. 9, 1994

[54] CLUTCH WITH A SYNCHRONIZING DEVICE

[75] Inventor: Reimund Raue, Friedrichshafen, Fed. Rep. of Germany

[73] Assignee: Zahnradfabrik Friedrichshafen AG, Fed. Rep. of Germany

[21] Appl. No.: 70,356

[22] PCT Filed: Dec. 14, 1991

[86] PCT No.: PCT/EP91/02411

§ 371 Date: Jun. 3, 1993

§ 102(e) Date: Jun. 3, 1993

[87] PCT Pub. No.: WO92/11473

PCT Pub. Date: Jul. 9, 1992

[30] Foreign Application Priority Data

Dec. 17, 1990 [DE] Fed. Rep. of Germany ....... 4040330

[51] Int. Cl.$^5$ .................... F16D 23/08; F16D 11/00; F16D 23/06
[52] U.S. Cl. .................... 192/48.91; 74/339; 192/53 F; 192/108
[58] Field of Search ............... 192/53 F, 108, 48.9, 192/48.91; 74/339

[56] References Cited

U.S. PATENT DOCUMENTS

| | | | |
|---|---|---|---|
| 1,977,204 | 10/1934 | Peterson | 74/339 |
| 2,916,943 | 12/1959 | Neracher et al. | 74/339 X |
| 2,947,396 | 8/1960 | Altmann | 74/339 X |
| 2,981,390 | 4/1961 | Doerper | 74/339 X |
| 4,817,773 | 4/1989 | Knodel et al. | 192/53 F |
| 4,830,158 | 5/1989 | Uno et al. | |
| 4,905,806 | 3/1990 | Hillenbrand et al. | 192/53 F |

FOREIGN PATENT DOCUMENTS

| | | |
|---|---|---|
| 0195706 | 9/1986 | European Pat. Off. |
| 2659448 | 8/1978 | Fed. Rep. of Germany |
| 3444670 | 7/1986 | Fed. Rep. of Germany |
| 3728902 | 9/1988 | Fed. Rep. of Germany |
| 4-64748 | 2/1992 | Japan ....................... 74/339 |

Primary Examiner—Rodney H. Bonck
Attorney, Agent, or Firm—Davis, Bujold & Streck

[57] ABSTRACT

In a clutch having a synchronizing device, post-synchronization is attained when the abutment of the locking teeth with the shift teeth changes by designing part of the locking teeth on the synchronizing ring wider than the remaining ones and engaging oblique surfaces of the shift teeth on a sleeve later than those of the narrower locking teeth.

6 Claims, 2 Drawing Sheets

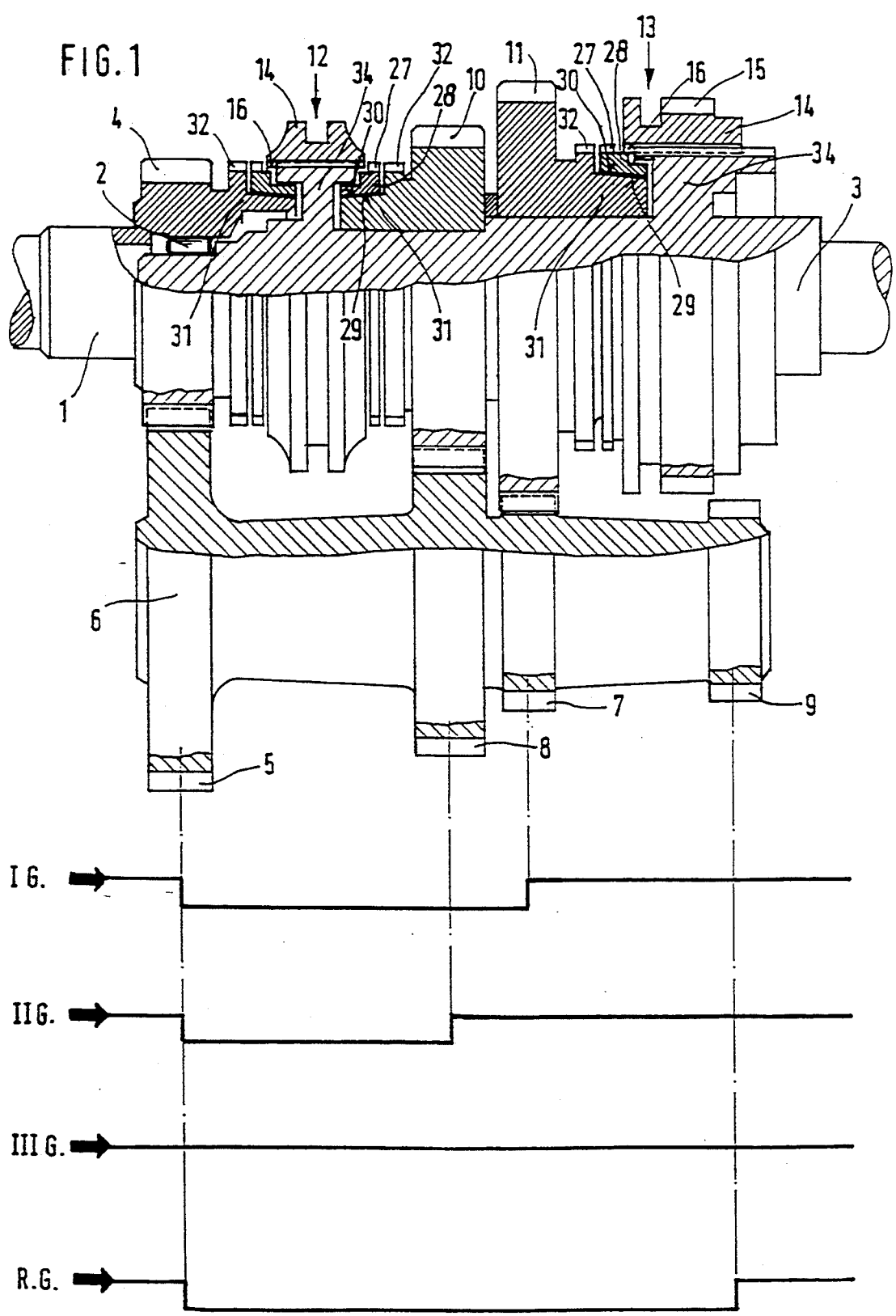

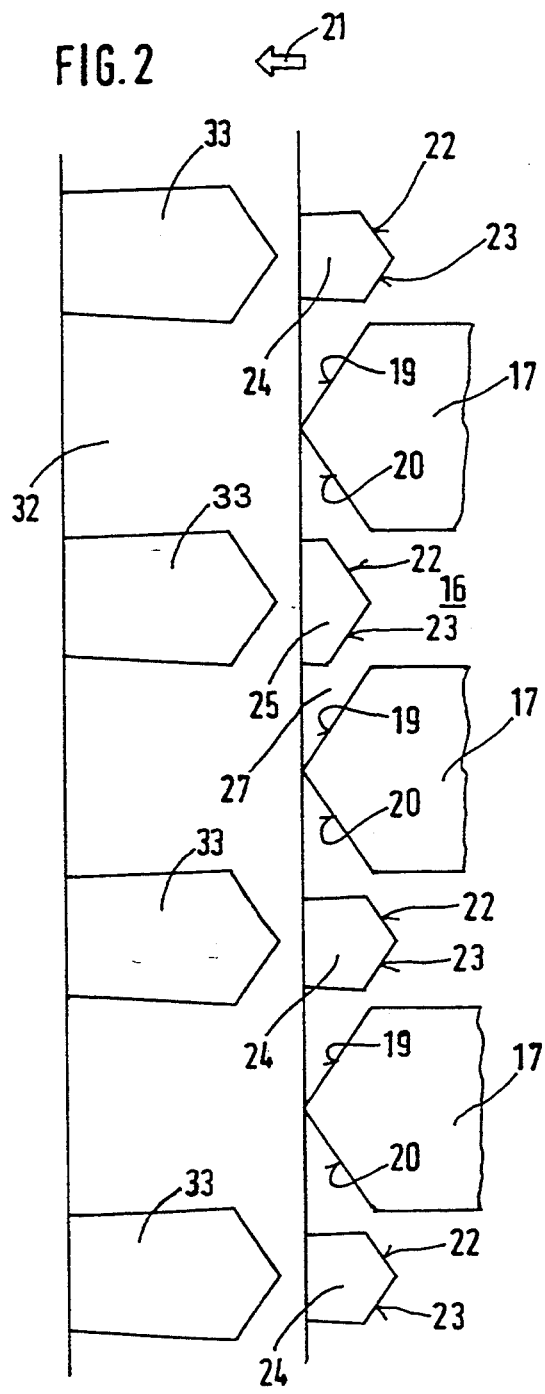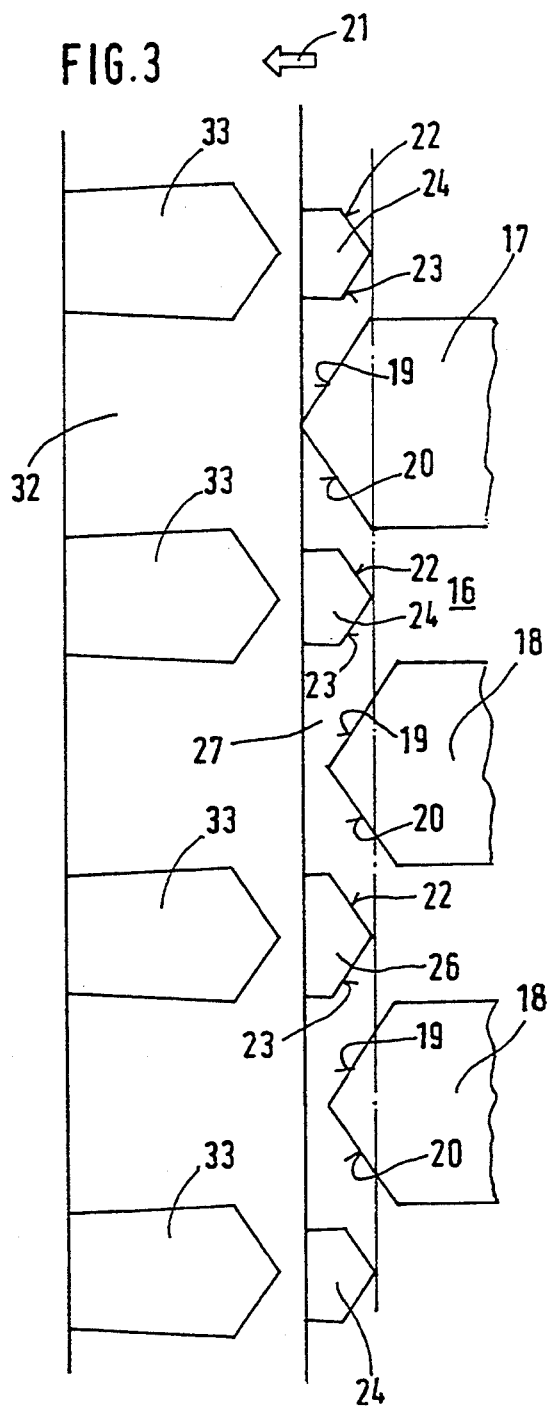

CLUTCH WITH A SYNCHRONIZING DEVICE

The invention concerns a clutch with a synchronizing device which has a clutch body non-rotatably connected with a gear rotatably supported on a shaft, clutch teeth and a friction cone. It also has a synchronizing ring with a countercone and locking teeth and a sleeve which has shift teeth of which at least one part interacts via oblique end-face surfaces with locking surfaces on the locking teeth. The sleeve is axially movably passed on a sleeve guide which is non-rotatably connected with the shaft.

In transmissions which are operated under traction interruption, that is, an input shaft is separated from a drive engine by means of a clutch during a change of speed, the respective speed can be introduced with a clutch of the above described kind by coupling the shaft with the gear that rotates on the shaft and belongs to the speed. Thereby, the torque in the connected condition is transmitted to the shaft by the gear via the clutch body, the clutch teeth, the shift teeth, the shift sleeve and the sleeve guide. The speed engaged determines the reduction ratio and thus the speed ratio between the input shaft and the output shaft of the transmission. The gears of the remaining speeds, which rotate freely and are constantly engaged, run at a speed corresponding to their reduction ratio and, specifically, the gears of a lower reduction stage which correspond to a higher speed run quicker than those of the higher reduction stage.

In order that the shift teeth of the sleeve can engage in the clutch gearing of the clutch body, the parts to be coupled previously must be brought to an equal speed. The synchronizing device serves this purpose. It consists essentially of a friction cone on the clutch body and a synchronizing ring with its countercone and the locking teeth. The synchronizing ring rotates with the sleeve, but it can rotate opposite thereto about a limited angle.

If the sleeve is moved in a direction of the gear to be engaged, the synchronizing ring will reach with its countercone against the cone of the clutch body. Here it rotates relative to the sleeve so that the oblique surfaces of the selector teeth strike on the locking surfaces of the locking teeth. An axial force is thereby exerted upon the synchronizing ring. The shifting force simultaneously produces, via the oblique surfaces, a restoring force on the synchronizing ring. When the parts rotate synchronously, the restoring force outbalances the peripheral force acting on the friction surfaces and brings the synchronizing ring to a neutral position in which the sleeve can be passed through.

Under normal conditions, that is, at temperatures for which the viscosity of the transmission oil has been fixed, the synchronous speed of the parts to be coupled is retained after the synchronization as result of the inertia until engagement has been completed. At low temperatures, where the transmission oil has a higher viscosity, the transmission oil strongly brakes the parts disengaged from the drive during the change of speed. Now, if a change over is to be effected from a higher reduction stage, from a lower speed, to a lower reduction stage, the gear that next rotates quicker is braked both by the synchronizing device and by the higher oil viscosity. Therefore, it passes already after a short time through the synchronization point in which the synchronizing ring rotates in an opposite direction relative to the sleeve. In the neutral position, the shifting stroke is briefly released and the shift teeth engage the locking teeth through interspaces. Since now the axial force is no longer exerted upon the synchronizing ring, the gear decreases in speed even more so that the shift teeth of the sleeve scratch on the coupling teeth prior to engaging. The resulting noises, the "cold scratching" are found annoying.

It is known (DE-C1 34 44 670) that the front oblique surface in a direction of rotation has on the shift sleeve a greater axial expansion than the rear oblique surface in the direction of rotation. It is obtained thereby that when going through the synchronization point the oblique surface lying in front of the direction of rotation builds up on the locking surface of the adjacent locking tooth an axial force and thus another drop in speed of the gears to be coupled is prevented.

The construction results in asymmetric oblique surfaces on the shift gearing so that the same gearing cannot be used for different directions of rotation. The result of this, in different applications, is a multiplicity of parts, elevated manufacturing and storage cost and the possibility of defective assemblage.

The invention is based on the problem of indicating another manner of avoiding the "cold scratching". The problem is solved according to the invention by the fact that the locking teeth have, in a peripheral direction, different widths so that the narrower ones have in the spaces between the shift teeth more play than the wider ones and when engaging the locking surfaces of the narrower locking teeth touch the oblique surfaces of the shift teeth earlier than those of the wider locking teeth.

When passing through the synchronization point, the shift teeth produce on the locking surfaces of the wider locking teeth an axial force which effects a post-synchronization. To obtain that the locking surfaces of the narrower locking teeth touch the oblique surfaces of the shift teeth earlier than the wider locking teeth, it is proposed, in the development of the invention, that the wider locking teeth be shorter axially than the narrower ones. In another variant of the invention, the axial extension of the locking teeth can be substantially equal, but in this case the shift teeth which form the interspaces for the wider locking teeth must be selected axially shorter. It is also conceivable to use the two steps in combination.

Since the post-synchronization occurs only in case of unfavorable operational conditions, and thus is relatively rare, it is sufficient as a rule to provide only a few wider locking teeth. Therefore, it is convenient to provide more narrower locking teeth than wider locking teeth.

In the design according to the invention, the oblique surfaces and locking surfaces can be constructed symmetrically and with equal angles so that the structural parts can be used independently of the direction of rotation. A multiplicity of parts and defective assemblage are thus avoided.

The embodiments of the invention are shown in the drawings.

FIG. 1 shows a longitudinal section through a set of gears of a 3-speed clutch with a reverse gear.

FIG. 2 shows partially a development of a shift gearing, a locking gearing and a clutch gearing.

FIG. 3 shows a variant of FIG. 2.

The transmission, according to FIG. 1, has an input shaft 1 supported via a roller bearing upon a shaft 3 that serves as output shaft. A countershaft 6, which has a gear 7 for a first speed, a gear 8 for a second speed and a gear 9 for a reverse speed, is driven via gears 4 and 5. The gears 7 and 8 are in constant engagement with the gears 11 and 10 which can freely rotate on the shaft 3 and can be non-rotatably connected with the shaft 3 via clutches 12, 13. The clutch 12 connects, in a third speed, the input shaft 1 directly with the shaft 3 so as to form a direct drive through the transmission. The clutch 13 has, on its sleeve 14, a displacement gear 15 with which the reverse speed can be engaged.

The clutch 12, opposite the clutch 13, is designed as a double clutch. But notwithstanding this, the parts of the clutches 12, 13 having the same function and are designated with the same numerals. The clutches 12, 13 essentially consist of the sleeve 14 with a shift gearing 16 which has shift teeth 17, 18 with oblique surfaces 19, 20. They form, in a shift direction 21, a wedge and work together with locking surfaces 22, 23 on locking teeth 24, 25, 26 of a locking gearing 27. The locking gearing 27 is situated on a synchronizing ring 28, the countercone 29 of which interacts with a friction cone 30 on a clutch body 31. The latter carries a clutch gearing 32 with clutch teeth 33 and is non-rotatably connected with the gears 10, 11 or the input shaft 1.

In the embodiment of FIGS. 2 and 3, the clutch gearing 32 is identical. The locking gearing 27 has different locking teeth, that is, in a peripheral direction narrower ones 24 and wider ones 25 (FIG. 2) or 26 (FIG. 3). Since, as a rule, the wider locking teeth 25, 26 are less in number, only one is respectively shown in FIGS. 2 and 3.

In the embodiment of FIG. 2, the shift teeth 17 are of equal length in an axial direction and their width is adjusted in a peripheral direction to the interspaces of the clutch gearing 32. The wider locking tooth 25 is axially somewhat shorter than the narrower locking teeth 24 so that its locking surfaces 22 and 23 come into contact with the oblique surface 20 or 19 only after a somewhat long shift stroke.

In the embodiment of FIG. 3, the narrower locking teeth 24 and the wider locking teeth 26 have substantially the same length. For this purpose, the shift teeth 18 adjacent the wider locking tooth 26 are correspondingly shortened.

The clutches work as follows:

The first speed is engaged when the gear 11 is coupled with the shaft 3 by the clutch 13. Based on the reduction ratio, the gear 10 rotates quicker than the shaft 3. Now if a change over to the second speed is made, the clutch 13 disengages and the gear 10 must be coupled, by means of the clutch 12, with the shaft 3. For this purpose, it must be slowed down to the speed of the shaft 3. This results by means of the synchronizing ring 28 which bears with its countercone 29 upon the friction cone 30 of the clutch body 31 and brakes it. The synchronizing ring 28 here rotates with respect to the sleeve 14 around a limited angle of rotation so that upon shift movement in the direction of the arrow 21, depending on the direction of rotation, the oblique surface 19 or 20 of the shift teeth 17 hits first on the locking surface 23 or 22 of the narrow locking teeth 24. The shift gearing 16 is hereby prevented from engaging in the clutch gearing 32 before a synchronous speed is obtained. The sleeve 24 exerts here an axial force on the synchronizing ring 28 and thus brakes, via the friction cone, the gear 10 with the clutch body 31.

At normal operational temperatures, the inertia moments are so long in proportion to the drag torques produced by the oil viscosity that the parts to be coupled remain at the synchronous speed point long enough to enable the shift gearing 16 to engage undisturbed in the clutch gearing 12. But, if on account of the high viscosity of the oil at low temperatures, the drag torques exceed a certain measure, the synchronous speed point is travelled very quickly and the synchronizing ring 28 is adjusted in an opposite direction relative to the sleeve 14. Hereby the abutment between the oblique surfaces 19, 20 and the locking surfaces 22, 23 changes and one locking surface 22 or 23 of the wider locking tooth 25, 26 hits upon an adjacent oblique surface 20 or 19 of the shift gearing 16. The overlapping corresponds to the different play that the narrow locking teeth 24 and the wider locking teeth 25, 26 have in the shift gearing 16.

The shift gearing 16 again produces an axial force. Thereby the gear 10 is again accelerated to a synchronous speed with the shaft 3. Since no renewed change of abutment occurs between the shift teeth and the locking teeth, the synchronous speed condition remains long enough to enable the shift teeth 17, 18 to engage undisturbed in the clutch gearing 32.

It is possible, in principle, to design the oblique surfaces 19 and 20 of the shift gearing 16 asymmetrically and with different angles. But in order to reduce the multiplicity of parts and avoid defective assemblage, it is advantageous to design the oblique surfaces 19, 20, the locking surfaces 22, 23 and the appertaining clutch teeth 33 symmetrically.

| Reference numerals | |
|---|---|
| 1 input shaft | 18 shift teeth |
| 2 roller bearing | 19 oblique surfaces |
| 3 shaft | 20 oblique surfaces |
| 4 gear | 21 shift direction |
| 5 gear | 22 locking surfaces |
| 6 countershaft | 23 locking surfaces |
| 7 gear for the 1st speed | 24 locking teeth |
| 8 gear for the 2nd speed | 25 locking teeth |
| 9 gear | 26 locking teeth |
| 10 gear | 27 locking gearing |
| 11 gear | 28 synchronizing ring |
| 12 clutch | 29 countercone |
| 13 clutch | 30 friction cone |
| 14 sleeve | 31 clutch body |
| 15 shifting gear | 32 clutch gearing |
| 16 shift gearing | 33 clutch teeth |
| 17 shift teeth | 34 sleeve guide |

I claim:

1. A clutch (12, 13) having a synchronizing device comprising:

at least one clutch body (31) having a friction cone (30) and fixedly supporting a gear (10, 11) and a plurality of clutch teeth (33), said clutch body (31) being rotatably supported on a first shaft (3);

at least one synchronizing ring (28) having a countercone (29), positioned for engagement with said friction cone (30), and supporting a plurality of locking teeth (24, 25, 26) which have locking surfaces (22, 23);

at least one slidable sleeve (14) having a plurality of shift teeth (17, 18), with oblique end-face surfaces (19, 20), being at least partially interactable with locking surfaces (22, 23) of said plurality of locking teeth (24, 25, 26); and at least one sleeve guide (34) being supported for rotation with said first shaft (3), said at least one slidable sleeve (14) being axially movable along a surface of said at least one sleeve guide (34) to facilitate engagement of a desired gear;

wherein some of said plurality of locking teeth (24, 25, 26) have, along a peripheral direction, a relatively wide width and a remainder of said plurality of locking teeth (24, 25, 26) have, along a peripheral direction, a relatively narrow width whereby said narrower width locking teeth (24) have more play in a space formed between adjacent pairs of said shift teeth (17, 18) than said wider width locking teeth (25, 26) and, during engagement of said clutch, said locking surfaces (22, 23) of said narrower width locking teeth (24) mesh with said oblique surfaces (19, 20) of said shift teeth (17, 18) prior to said wider width locking teeth (25, 26) meshing with said oblique surfaces (19, 20) of said shift teeth (17, 18).

2. A clutch according to claim 1, wherein said wider width locking teeth (25) have a shorter axial length than said narrower width locking teeth (24).

3. A clutch according to claim 1, wherein adjacent shift teeth (18), which form a space for said wider locking teeth (26), have a shorter axial length than the remaining shift teeth (17).

4. A clutch according to claim 1, wherein a ratio of the number of said narrower width locking teeth (24) to the number of said wider width locking teeth (25, 26) is greater than one.

5. A clutch according to claim 1, wherein said clutch further comprises an input shaft (1) coaxially aligned with said first shaft (3);

a second clutch body (31) which has a friction cone (30) and fixedly supports a second gear (10) and a plurality of clutch teeth (33), said second clutch body (31) is rotatably supported on said first shaft (3);

a second synchronizing ring (28) which has a countercone (29), positioned for engagement with said friction cone (30) of said second clutch body (31), and supports a plurality of locking teeth (24, 25, 26) which have locking surfaces (22, 23);

a second slidable sleeve (14) which has a plurality of shift teeth (17, 18), with oblique end-face surfaces (19, 20), which are at least partially interactable with said locking surfaces (22, 23) of said plurality of locking teeth (24, 25, 26) of second synchronizing ring (28);

a second sleeve guide (34) which is supported for rotation with said first shaft (3), said second slidable sleeve (14) is axially movable along a surface of said second sleeve guide (34) to provide engagement of a desired second gear;

a third clutch body (31) which has a fraction cone (30) and a plurality of clutch teeth (33), said third clutch body (31) is supported by said input shaft (1);

a third synchronizing ring (28) which has a countercone (29), positioned for engagement with said friction cone (30) of said third clutch body (31), and supports a plurality of locking teeth (24, 25, 26) which have locking surfaces (22, 23); and said second slidable sleeve (14) further has a plurality of shift teeth (17, 18), with oblique end-face surfaces (19, 20), which are at least partially interactable with said locking surfaces (22, 23) of said plurality of locking teeth (24, 25, 26) of said third synchronizing ring (28), and said second slidable sleeve (14) is axially movable along said second sleeve guide (34) to provide engagement of a desired third gear.

6. A clutch (12, 13) having a synchronizing device comprising:

at least one clutch body (31) having a friction cone (30) and fixedly supporting a gear (10, 11) and a plurality of clutch teeth (33), said clutch body (31) being rotatably supported on a shaft (3);

at least one synchronizing ring (28) having a countercone (29) positioned for engagement with said friction cone (30), said at least one synchronizing ring (28) supporting a plurality of locking teeth (24, 25, 26) which have locking surfaces (22, 23);

at least one slidable sleeve (14) having a plurality of shift teeth (17, 18) with oblique end-face surfaces (19, 20), said plurality of shift teeth (17, 18) being at least partially interactable with said locking surfaces (22, 23) of said plurality of locking teeth (24, 25, 26); and at least one sleeve guide (34) being supported for rotation with said shaft (3), said at least one slidable sleeve (14) being axially movable along said at least one sleeve guide (34) to facilitate engagement of a desired gear;

wherein some of said plurality of locking teeth (24, 25, 26) have, along a peripheral direction, a relatively wide width and a remainder of said plurality of locking teeth (24, 25, 26) have, along a peripheral direction, a relatively narrow width whereby said narrower width locking teeth (24) have more play in a space formed between adjacent pairs of said shift teeth (17, 18) than said wider width locking teeth (25, 26) and, during engagement of said clutch, said narrower width locking teeth (24) engage with adjacent shift teeth (17, 18) prior to said wider width locking teeth (25, 26) engaging with adjacent shift teeth (17, 18).

* * * * *